United States Patent
Ceylan et al.

(10) Patent No.: US 10,600,142 B2
(45) Date of Patent: Mar. 24, 2020

(54) COMPRESSION AND DECOMPRESSION OF INDICES IN A GRAPHICS PIPELINE

(71) Applicant: ADVANCED MICRO DEVICES, INC., Santa Clara, CA (US)

(72) Inventors: Usame Ceylan, San Diego, CA (US); Young In Yeo, San Diego, CA (US); Todd Martin, Orlando, FL (US); Vineet Goel, San Diego, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/832,131

(22) Filed: Dec. 5, 2017

(65) Prior Publication Data
US 2019/0172173 A1 Jun. 6, 2019

Related U.S. Application Data

(60) Provisional application No. 62/580,795, filed on Nov. 2, 2017.

(51) Int. Cl.
| | | |
|---|---|---|
| *G06T 9/00* | (2006.01) | |
| *G06T 1/20* | (2006.01) | |
| *G06T 15/00* | (2011.01) | |
| *G06T 11/00* | (2006.01) | |

(52) U.S. Cl.
CPC ............ *G06T 1/20* (2013.01); *G06T 9/00* (2013.01); *G06T 9/001* (2013.01); *G06T 11/001* (2013.01); *G06T 15/005* (2013.01); *G06T 2210/08* (2013.01)

(58) Field of Classification Search
CPC ......... G06T 9/001; G06T 17/20; G06T 9/004; G06T 15/10; G06T 17/205; G06T 9/005
See application file for complete search history.

(56) References Cited

U.S. PATENT DOCUMENTS

| | | | |
|---|---|---|---|
| 2008/0270147 A1 | 10/2008 | Pang et al. | |
| 2011/0109638 A1 | 5/2011 | Duluk, Jr. et al. | |
| 2011/0221743 A1 | 9/2011 | Keall et al. | |
| 2014/0168221 A1* | 6/2014 | Fishwick | G06T 17/20 345/423 |
| 2016/0071234 A1* | 3/2016 | Lehtinen | G06F 16/9027 345/420 |
| 2017/0262954 A1 | 9/2017 | Arntzen | |

OTHER PUBLICATIONS

International Search Report and Written Opinion dated Jan. 16, 2019 in Application No. PCT/US018/052836, 14 pages.

* cited by examiner

*Primary Examiner* — Hau H Nguyen

(57) ABSTRACT

A compute unit accesses a chunk of bits that represent indices of vertices of a graphics primitive. The compute unit sets values of a first bit to indicate whether the chunk is monotonic or ordinary, second bits to define an offset that is determined based on values of indices in the chunk, and sets of third bits that determine values of the indices in the chunk based on the offset defined by the second bits. The compute unit writes a compressed chunk represented by the first bit, the second bits, and the sets of third bits to a memory. The compressed chunk is decompressed and the decompressed indices are written to an index buffer. In some embodiments, the indices are decompressed based on metadata that includes offsets that are determined based on values of the indices and bitfields that indicate characteristics of the indices.

20 Claims, 7 Drawing Sheets

COMPRESSION AND DECOMPRESSION OF INDICES IN A GRAPHICS PIPELINE

BACKGROUND

Graphics processors generate images for display using a graphics pipeline that includes a sequence of programmable shaders and fixed function hardware blocks to render images based on a model of a scene. For example, a 3-D model of an object that is visible in a frame is represented by a set of primitives such as triangles, other polygons, or patches that are processed in a graphics pipeline to produce values of pixels for display to a user. Each primitive is represented by values, such as red-green-blue (RGB) colors, at vertices of the primitive. For example, a triangle is represented by a set of values at the three vertices of the triangle. The graphics pipeline accesses vertices of the triangles using indices that identify the vertices. An index of a vertex is represented by a binary number that typically includes 16 bits or 32 bits. Indices for a set of triangles are processed in "chunks" that include a predetermined number of indices, such as 16 indices per chunk. The chunks are stored in an index buffer prior to being used by the graphics pipeline.

A chunk is either an ordinary chunk or a monotonic chunk. An ordinary chunk sequentially lists the three vertices for each triangle in the chunk. A monotonic chunk takes advantage of the fact that adjacent triangles share two vertices. For example, a tri-strip mesh of triangles includes a large proportion of triangles that are adjacent to each other. The monotonic chunk represents successive adjacent triangles by adding only the index of the vertex that is not shared by the adjacent triangles. The monotonic chunk therefore does not repeat the indices of vertices that are shared by two successive triangles. For example, if the vertices of a first triangle have the indices 8, 9, 10 and the vertices of a second triangle have the indices 9, 10, 11, the representation of the first and second triangles in a monotonic chunk would list the indices 8, 9, 10, and 11. In contrast, an ordinary chunk would represent the first and second triangles as 8, 9, 10, 9, 10, 11. Successively dispatched triangles are not always adjacent and so monotonic chunks include a restart index to indicate that the next index identifies a vertex of a triangle that does not share vertices with the previous triangle in the monotonic chunk.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
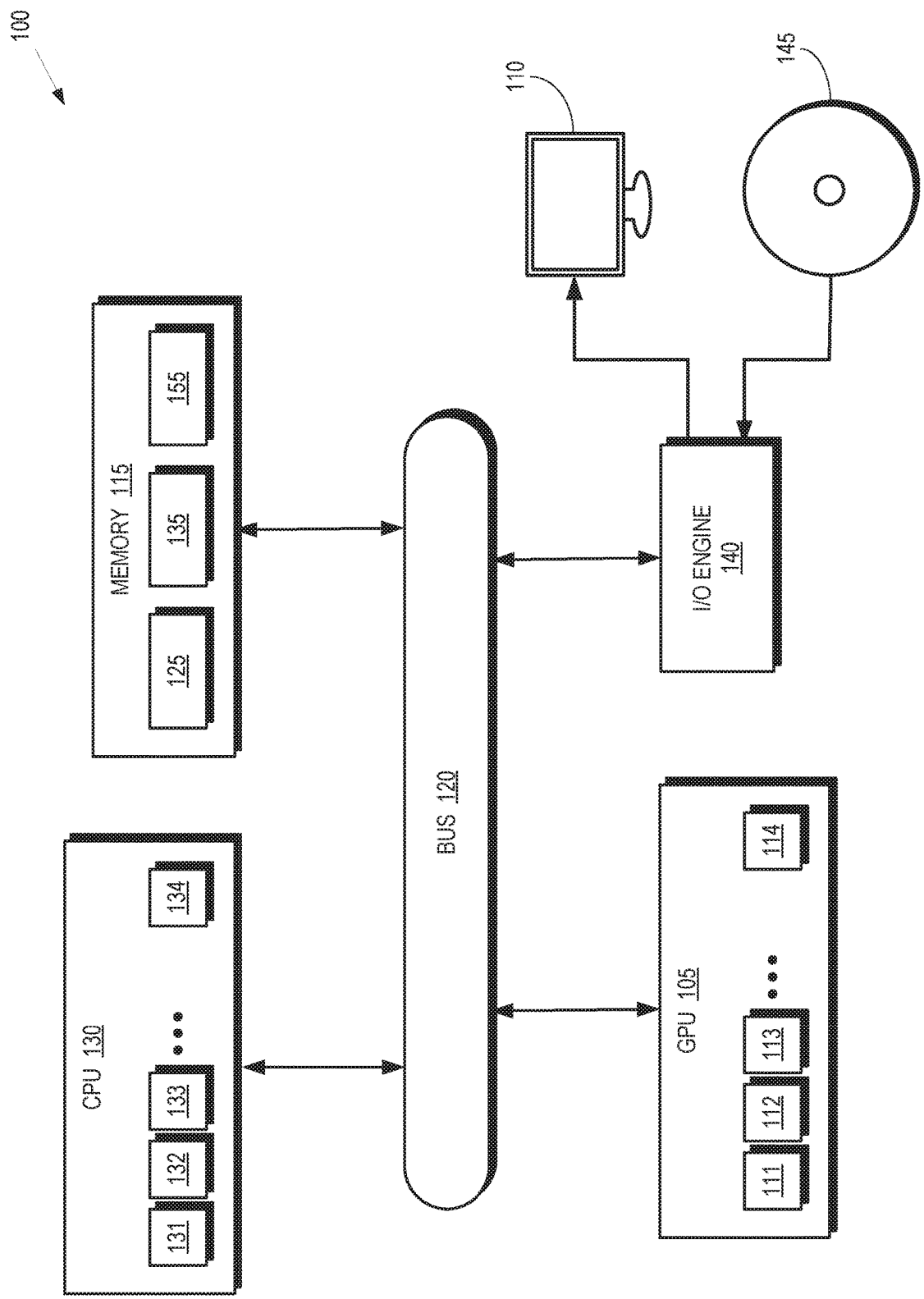
FIG. 1 is a block diagram of a processing system that includes a graphics processing unit (GPU) for generating visual images intended for output to a display according to some embodiments.

Sets of indices (referred to herein as "chunks") are compressed for storage in index buffers by using a first bit to indicate whether the chunk is monotonic or ordinary and second bits to define an offset that is determined based on values of indices in the chunk. A compressed chunk also includes sets of third bits that determine values of each index in the chunk based on the offset defined by the second bits. Compressed chunks are then stored in a memory and metadata is generated that represents beginning addresses of the compressed chunks stored in the memory. The compressed chunks are fetched from the memory (or a related a cache) based on the metadata. For example, a decompression unit determines lines of the cache that overlap with a compressed chunk using the beginning addresses stored in the metadata and then fetches the overlapping cache lines. The values of the indices in the chunk are determined based on the first bit, the second bits, and the sets of third bits.

Monotonic chunks are compressed by setting the first bit to a value that indicates that the chunk is a monotonic chunk and setting the second bits to an offset value that is equal to a value of a first index in the monotonic chunk that is not a restart index. A first set of third bits is set to a value that indicates the number of restart indices in the monotonic chunk and one or more additional sets of third bits are set to values that indicate the locations of the restart indices within the monotonic chunk. Ordinary chunks are compressed by setting the first bit to a value that indicates that the chunk is an ordinary chunk and setting the second bits to an offset value that is equal to a minimum index value of the indices in the ordinary chunk. A first set of third bits is set to a value that indicates a number of bits that are used to represent differences between values of the indices and the minimum index value. A second set of third bits is used to indicate that corresponding indices are unique and to indicate a value of the unique index relative to the offset. A third set of third bits is used to indicate that corresponding indices are repeated values of unique indices and to indicate a relative location of the unique index in the ordinary chunk.

In some embodiments, indices of the compressed chunks are decompressed concurrently or in parallel by storing a set of header bits in the metadata instead of storing this information in the compressed chunk. For monotonic chunks, the first bit and the second bits are included in the set of header bits that is stored in the metadata. The header bits also include a bit field representing locations of the restart indices. For ordinary chunks, the first bit and the second bits are included in the set of header bits that is stored in the metadata. The header bits also include a bit field having values of bits that indicate the locations of the unique indices in the compressed chunk. The metadata for the ordinary chunk further includes the first set of third bits that indicate the number of bits that are used to represent differences between values of the indices and the minimum index value. Lanes that are used to decompress the indices in the compressed chunk are selectively enabled based on the bit fields stored in the metadata, thereby preserving the order of the decompressed indices in the chunk.

FIG. 1 is a block diagram of a processing system 100 that includes a graphics processing unit (GPU) 105 for generating visual images intended for output to a display 110 according to some embodiments. The GPU 105 is a multi-threaded processor that includes a plurality of compute units 111, 112, 113, 114, which are collectively referred to herein as "the compute units 111-114." The compute units 111-114 are configured to execute instructions concurrently or in parallel. Some embodiments of the compute units 111-114 are configured to implement a relatively small set of operations, such as basic mathematical operations required for video rendering. Although four compute units 111-114 are shown in FIG. 1 in the interest of clarity, some embodiments of the GPU 105 include tens or hundreds or thousands of compute units. Some embodiments of the compute units 111-114 concurrently execute multiple instances (or waves) of a single program on multiple data sets, e.g. as single instruction, multiple data (SIMD) waves. For example, the compute units 111-114 are configured to perform the same sequence of operations on arrays or streams of data.

The processing system 100 includes a memory 115. Some embodiments of the memory 115 are implemented as a dynamic random access memory (DRAM). However, in other embodiments, the memory 115 is implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 executes instructions stored in the memory 115 and the GPU 105 stores information in the memory 115 such as the results of the executed instructions. For example, the memory 115 stores a copy 125 of instructions from a program code that is to be executed by the compute units 111-114 in the GPU 105.

The processing system 100 includes a central processing unit (CPU) 130 for executing instructions. Some embodiments of the CPU 130 include multiple processor cores 131, 132, 133, 134 (collectively referred to herein as "the processor cores 131-134") that are optimized for sequential serial processing. The processor cores 131-134 implement relatively large instruction sets (e.g., relative to the small instruction sets implemented by the compute units 111-114) and large feature sets that enable the CPU 130 to perform the full repertoire of calculations that are required by applications executing in the processing system 100. Some embodiments of the CPU 130 are able to implement multiple pipelines using the processor cores 131-134. The CPU 130 is also connected to the bus 120 and therefore communicates with the GPU 105 and the memory 115 via the bus 120. The CPU 130 executes instructions such as program code 135 stored in the memory 115 and the CPU 130 stores information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). In response to the draw call, the GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as a compact disk (CD), a digital versatile disc (DVD), a networked server, and the like. The external storage medium 145 stores information representative of program code used to implement an application such as a video game. The program code on the external storage medium 145 is written to the memory 115 to form the copy 125 of instructions that are to be executed by the GPU 105 or the program code 135 that is to be executed by the CPU 130.

The compute units 111-114 in the multithreaded GPU 105 share resources that are used to support execution of waves in the GPU 105. Some embodiments of the GPU 105 implement a set of vector general-purpose registers (VGPR, not shown in FIG. 1 in the interest of clarity) that store state information for the waves that are executing on the compute units 111-114. The VGPRs are shared between the waves that are concurrently executing on the compute units 111-114. For example, each wave is allocated a subset of the VGPRs to store state information for the wave. The waves also share other resources of the GPU 105 including a local data share that is partitioned among the concurrently executing waves, memory bandwidth that is shared by the waves for accessing local caches, and the like. The processor cores 131-134 in the multithreaded CPU 130 also share resources.

The GPU 105 is configured to implement multiple pipelines for executing multiple workloads concurrently or in parallel. Some embodiments of the compute units 111-114 are used to implement graphics pipelines that execute graphics workloads to render images of objects for presentation on the display 110. For example, the compute units 111-114 perform graphics operations by executing multiple instances of shaders that operate on primitives, such as triangles that represent portions of a 3D model of a scene. The primitives are defined by a set of vertices. For example, a triangle is represented by a set of values at the three vertices of the triangle. The compute units 111-114 are able to access vertices of the triangles using indices that identify the vertices. For example, the compute units 111-114 access the indices from an index buffer (not shown in FIG. 1 in the interest of clarity) when the compute units 111-114 are ready to begin processing of the vertices of the primitive.

The indices for a set of triangles are referred to herein as a "chunk" that includes a predetermined number of indices, such as 16 indices per chunk. The chunks are compressed to conserve resources of the processing system 100. In some embodiments, compression is performed off-line (e.g., before the compute units 111-114 are ready to begin processing of the vertices indicated by the indices) by the GPU 105 or other processing units in the processing system 100 and the compressed indices are stored in a memory such as the memory 115. Metadata is also generated and stored in the memory 115. In the illustrated embodiment, the compressed indices and the metadata are stored in a block 155 of the memory 115. However, in other embodiments, the metadata and the compressed indices are stored in other locations and do not need to be stored in the same location in all embodiments. The GPU 105 retrieves the metadata from the block 155 when the compute units 111-114 are ready to begin processing of the vertices. In some embodiments, the metadata is used to retrieve the compressed indices from the block 155 and the compressed indices are stored in a cache. The GPU 105 decompresses the compressed indices on the fly and stores the decompressed indices in the index buffer so that they are available to the compute units 111-114.

Figure 2:
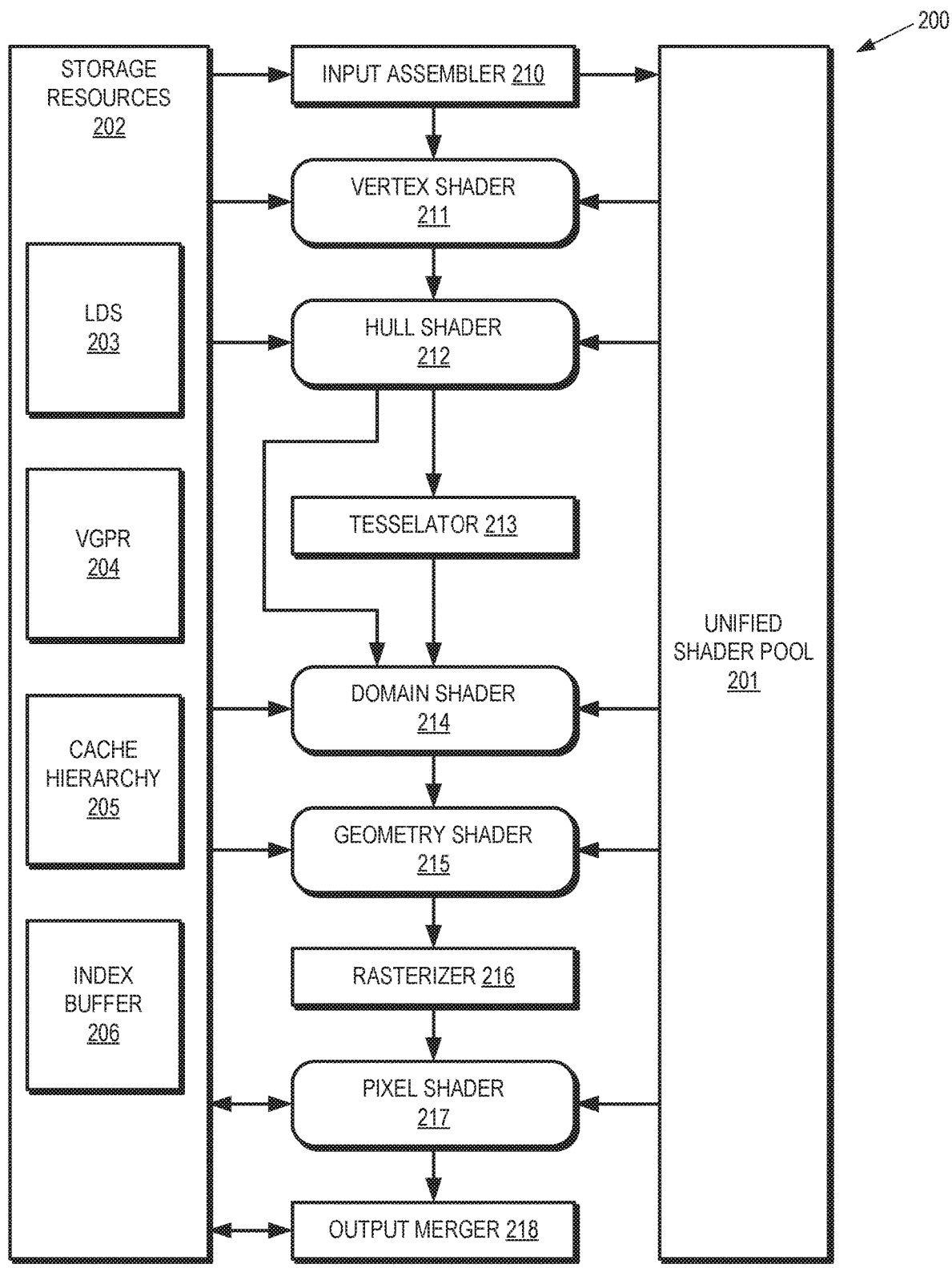
FIG. 2 depicts a graphics pipeline that is capable of processing high-order geometry primitives to generate rasterized images of three-dimensional (3-D) scenes according to some embodiments.

FIG. 2 depicts a graphics pipeline 200 that is capable of processing high-order geometry primitives to generate rasterized images of three-dimensional (3-D) scenes according to some embodiments. The graphics pipeline 200 is implemented in some embodiments of the GPU 105 shown in FIG. 1. For example, in some embodiments the graphics pipeline 200 is implemented using the compute units 111-114 in the GPU 105 shown in FIG. 1. The graphics pipeline 200 shown in FIG. 2 implements a unified shader model so that all the shaders included in the graphics pipeline 200 have the same execution platform on the shared SIMD processor cores. The shaders are therefore implemented using a common set of resources that is referred to herein as the unified shader pool 201. Some embodiments of the unified shader pool 201 are implemented using the compute units 111-114 implemented in the GPU 105 shown in FIG. 1.

Storage resources 202 are shared by the stages of the graphics pipeline 200. The storage resources 202 include a local data store (LDS) 203 that is used for read/write communication and synchronization within a workgroup of multiple waves. The storage resources 202 also include VGPR 204 that store state information that define the current state of the waves, such as intermediate results of operations that have been performed by the waves. The storage resources 202 further include a cache hierarchy 205 that is used to cache information such as compressed chunks, metadata, vertex data, texture data, and other data that is frequently used by one or more of the stages of the graphics pipeline 200. The storage resources 202 further include an index buffer 206 that is used to store decompressed indices of the vertices for access by entities in the graphics pipeline 200. In some embodiments, the storage resources 202 also include other registers, buffers, memories, or caches. The shared resources of the graphics pipeline 200 also include bandwidth in the memory fabric that is used to support communication between the stages of the graphics pipeline 200 and the storage resources 202. Portions of the storage resources 202 are implemented on-chip as part of the GPU 105 shown in FIG. 1 or off-chip using some embodiments of the memory 115 shown in FIG. 1. Although a single graphics pipeline 200 shown in FIG. 2, some embodiments of the storage resources 202 (as well as the unified shader pool 201) are shared by multiple graphics pipelines.

The graphics pipeline 200 includes an input assembler 210 that is configured to access information from the storage resources 202 that is used to define objects that represent portions of a model of a scene. Some embodiments of the input assembler 210 are configured to retrieve indices of vertices from the index buffer 206 and use the retrieved indices to identify vertices that are then provided to downstream entities in the graphics pipeline 200.

A vertex shader 211, which is implemented in software for example, logically receives a single vertex of a primitive as input and outputs a single vertex. Some embodiments of shaders such as the vertex shader 211 implement single-instruction-multiple-data (SIMD) processing so that multiple vertices are processed concurrently, e.g., by the compute units that are used to implement the unified shader pool 201.

A hull shader 212 operates on input high-order patches or control points that are used to define the input patches. The hull shader 212 outputs tessellation factors and other patch data. Primitives generated by the hull shader 212 are optionally provided to a tessellator 213. The tessellator 213 receives objects (such as patches) from the hull shader 212 and generates information identifying primitives corresponding to the input object, e.g., by tessellating the input objects based on tessellation factors provided to the tessellator 213 by the hull shader 212. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 214 inputs a domain location and (optionally) other patch data. The domain shader 214 operates on the provided information and generates a single vertex for output based on the input domain location and other information. A geometry shader 215 receives an input primitive and outputs up to four primitives that are generated by the geometry shader 215 based on the input primitive. One stream of primitives is provided to a rasterizer 216 and up to four streams of primitives are concatenated to buffers in the storage resources 202. The rasterizer 216 performs shading operations and other operations such as clipping, perspective dividing, scissoring, and viewport selection, and the like. A pixel shader 217 inputs a pixel flow and outputs zero or another pixel flow in response to the input pixel flow. An output merger block 218 performs blend, depth, stencil, or other operations on pixels received from the pixel shader 217.

Figure 3:
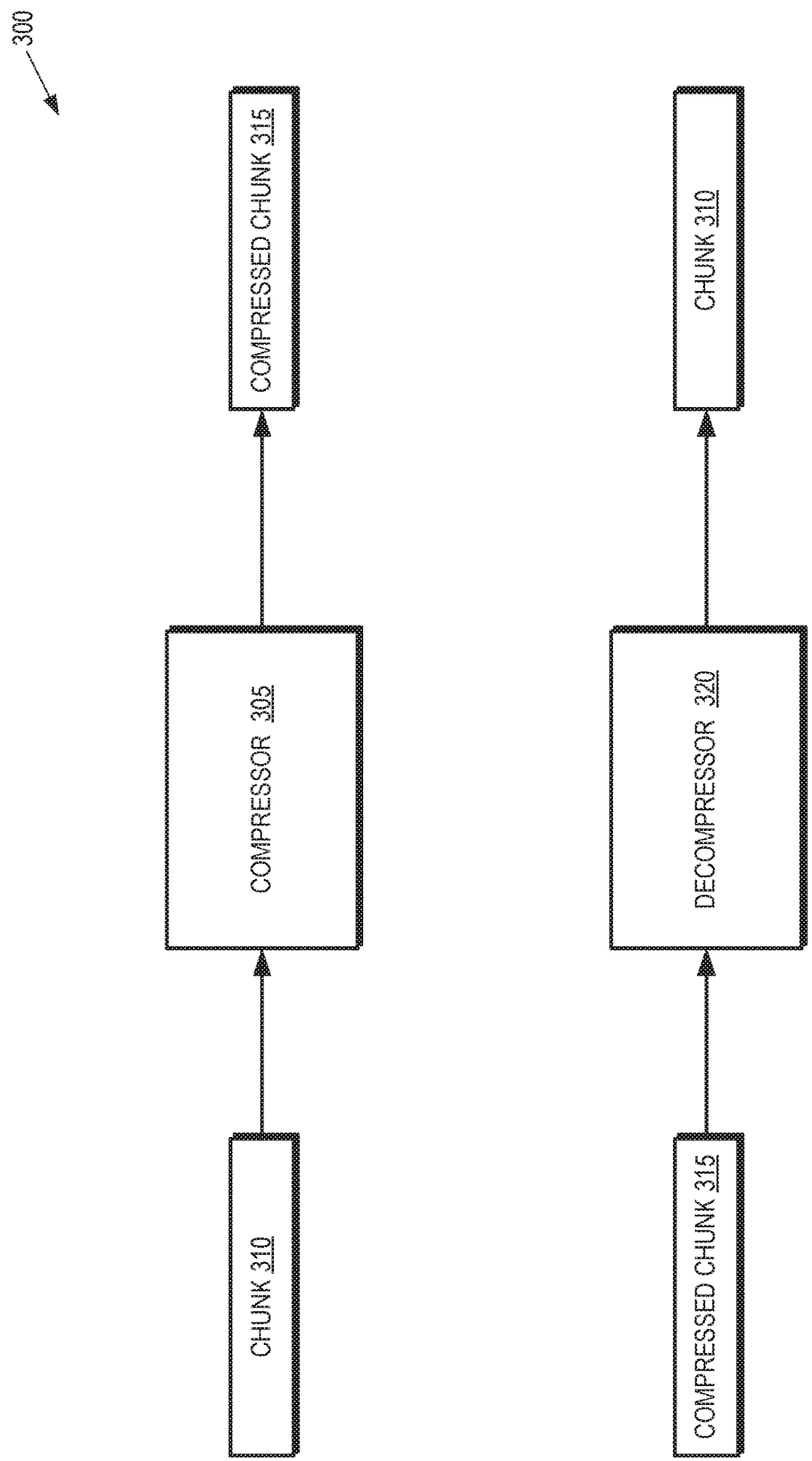
FIG. 3 is a block diagram illustrating a portion of a processing system according to some embodiments.

FIG. 3 is a block diagram illustrating a portion 300 of a processing system according to some embodiments. The portion 300 is implemented in some embodiments of the processing system 100 shown in FIG. 1 and the graphics pipeline 200 shown in FIG. 2. The portion 300 includes a compressor 305 that is configured to compress a chunk 310 of indices that identify vertices of graphics primitives. The compressor 305 generates a compressed chunk 315 that includes bits that represent compressed indices from the chunk 310. The portion also includes a decompressor 320 that is configured to decompress a compressed chunk 315 that includes bits that represent the compressed indices. The decompressor 320 generates bits that represent the indices in the chunk 310. Some embodiments of the compressor 305 and the decompressor 320 are implemented using compute units such as the compute units 111-114 shown in FIG. 1. Other embodiments of the compressor 305 and the decompressor 320 are implemented as separate hardware blocks within a processing unit such as the GPU 105 shown in FIG. 1.

Figure 4:
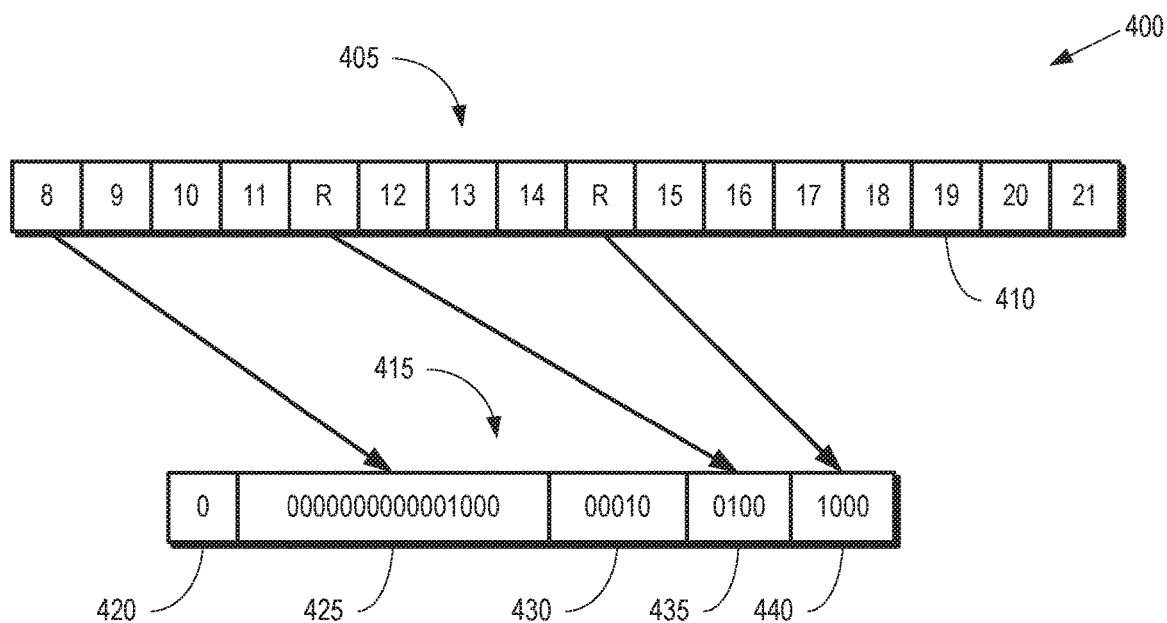
FIG. 4 is a diagram that illustrates a method of compressing indices in monotonic chunks according to some embodiments.

FIG. 4 is a diagram that illustrates a method 400 of compressing indices in monotonic chunks according to some embodiments. The method 400 is implemented in some embodiments of the processing system 100 shown in FIG. 1, the graphics pipeline 200 shown in FIG. 2, and the portion 300 of the processing system shown in FIG. 3.

The method 400 operates on a monotonic chunk 405 that includes bits representative of sixteen indices 410 (only one indicated by a reference numeral in the interest of clarity).

As used herein, the term "monotonic chunk" refers to a chunk that represents successive adjacent triangles by adding only the index of the vertex that is not shared by the adjacent triangles. The monotonic chunk 405 therefore does not repeat the indices of vertices that are shared by two successive triangles. For example, the vertices of a first triangle have the indices 8, 9, 10 and the vertices of a second triangle have the indices 9, 10, 11. The monotonic chunk 405 therefore represents the first and second triangles as a list of the indices 8, 9, 10, and 11.

The indices 410 include a special index that is referred to herein as a restart index (R). The restart index indicates that the next index 410 is the index of a first vertex of a new triangle that does not share any vertices with the previous triangle. In the illustrated embodiment, the restart index between the indices 11 and 12 indicates that the next triangle includes vertices identified by the indexes 12, 13, and 14. The restart index also indicates that the next triangle does not share any of the vertices of the previous triangle, which are identified by the indexes 9, 10, or 11. The particular number of bits or indices in the chunk 405 is a matter of design choice. The indices 410 are indicated by Roman numerals (or the letter R) in FIG. 4. However, in practice the indices 410 are represented by sets of bits that indicate the value of the corresponding index 410. The number of bits used to represent each index 410 in the illustrated embodiment is 16 bits. Other numbers of bits, e.g., 32 bits, are used to represent the indices 410 in other embodiments. The restart index is indicated by a reserved value of the bits used to represent the indices 410

A compressor such as the compressor 305 shown in FIG. 3 generates a compressed chunk 415 using the values of the indices 410 in the chunk 405. The compressor sets a value of a first bit 420 to a value that indicates that the compressed chunk 415 represents a compressed monotonic chunk, e.g., by setting the value to 0. The compressor sets the values of bits 425 to values that represent an offset that is equal to a value of the first index in the chunk 405. In the illustrated embodiment, the values of the bits 425 are set to " . . . 001000" to indicate an offset value of eight. The compressor also generates values of bits 430 to indicate a number of restart indices that are found within the monotonic chunk 405. The number of bits 430 depends on the number of indices 410 in the chunk 405. In the illustrated embodiment, five bits are required if the number of indices 410 in the chunk 405 is equal to sixteen because as many as sixteen restart indices are potentially found in the monotonic chunk 405. For example, the bits 430 are set to a value of "00010" to indicate that there are two restart indexes in the monotonic chunk 405. Locations of the restart indices within the monotonic chunk 405 are indicated by the bits 435, 440. The indices 410 are numbered 0-15 in the illustrated embodiment. For example, the bits 435 are set to a value of "0100" to indicate that the first restart index is found at the fifth index of the monotonic chunk 405. For another example, the bits 440 are set to a value of "1000" to indicate that the second restart index is found at the ninth index of the monotonic chunk 405.

The compressed chunk 410 includes fewer bits than the monotonic chunk 405, while including all the information necessary to reconstruct the indices 410 in the monotonic chunk 405. A decompressor such as the decompressor 320 shown in FIG. 3 is therefore able to decompress the compressed chunk 410 by inverting the method 400 to recover the decompressed indices 410. In the best case scenario, the compressed chunk 410 includes only 4% of the number of bits in the monotonic chunk 405. In the worst case scenario, where all the indices 410 are restart indices, which does not happen in practice, the method 400 generates 17% compression. Testing on actual graphics processing workloads indicates that the compression ratio is usually closer to the 4% compression of the best case scenario than the 17% compression of the worst case scenario.

Figure 5:
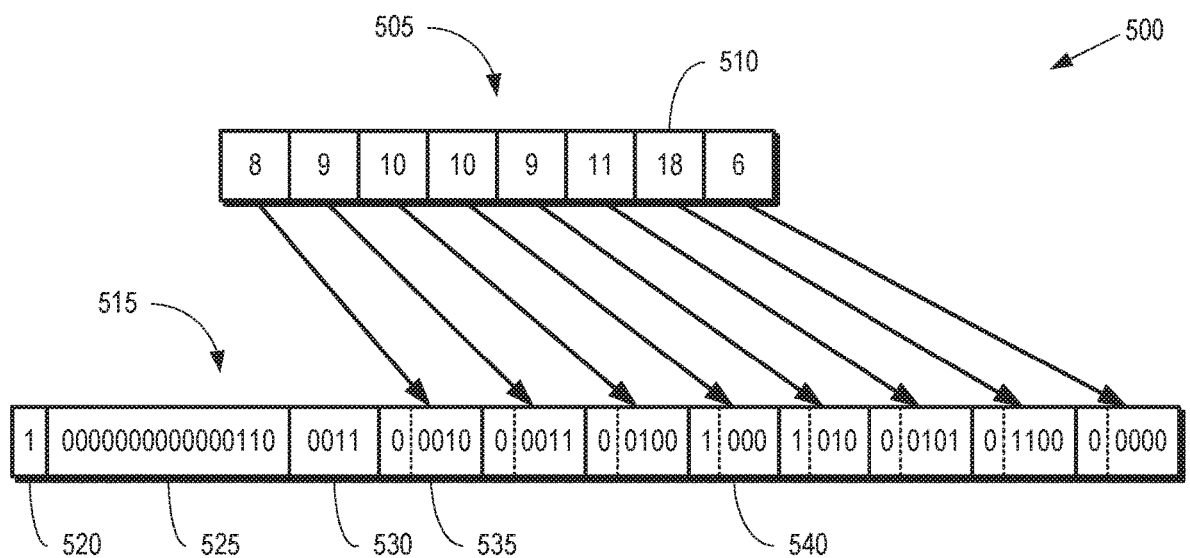
FIG. 5 is a diagram that illustrates a method of compressing indices in ordinary chunks according to some embodiments.

FIG. 5 is a diagram that illustrates a method 500 of compressing indices in ordinary chunks according to some embodiments. The method 500 is implemented in some embodiments of the processing system 100 shown in FIG. 1, the graphics pipeline 200 shown in FIG. 2, and the portion 300 of the processing system shown in FIG. 3.

The method 500 operates on an ordinary chunk 505 that includes bits representative of eight indices 510 (only one indicated by a reference numeral in the interest of clarity). As used herein, the term "ordinary chunk" refers to a chunk that sequentially lists the three vertices for each triangle in the chunk. For example, the ordinary chunk 505 lists the indices 8, 9, and 10 that identify vertices of a first triangle and subsequently lists the indices 10, 9, and 11 that identify the vertices of a second triangle. The ordinary chunk 505 does not necessarily list all of the indices for the vertices of each triangle. For example, the ordinary chunk 505 lists the indices 18 and 6 that identify two vertices of a third triangle, but does not include the index of the third vertex of the third triangle.

A compressor such as the compressor 305 shown in FIG. 3 generates a compressed chunk 515 using the values of the indices 510 in the chunk 505. The compressor sets a value of a bit 520 to a value that indicates that the compressed chunk 515 represents a compressed ordinary chunk, e.g., by setting the value to 1. The compressor sets the bits 525 to an offset that is equal to a minimum value of the indices 510. In the illustrated embodiment, the minimum value of the indices 510 is equal to six, and so the offset is represented by the bits 525 being set to " . . . 00110." The compressor sets the bits 530 to a value that indicates a number of bits that are needed to represent differences between values of the indices 510 and the offset value. The value represented by the bits 530 is therefore determined by a difference between the maximum value and the minimum value of the indices 510:

$$N_{bits} = \log_2(\max - \min)$$

In the illustrated embodiment, the maximum value is 18 and the minimum value is 6. The difference between these values is therefore represented with four bits. The value of the bits 530 is set to "0011" to indicate that the number of bits is 3+1=4.

The bits that are used to represent the values of the indices 510 are determined based on whether the value of the indices 510 is "unique," which indicates that the current index has a value that is not equal to the value of any previous index within the chunk 505, or "repeat," which indicates that the current index has a value that is equal to the value of at least one previous index within the chunk 505. Bits 535 include one bit that is set to a value (e.g. a value of 0) to indicate that the corresponding index is a unique index and four bits to indicate a difference between the value of the index and the minimum value indicated by the offset 525. For example, the bits 535 include four bits that are set to a value of "0010" to indicate that the value of the index differs from the offset 525 by two so that the value of the index is 6+2=8. Bits 540 include one bit that is set to a value (e.g., a value of 1) to indicate that the corresponding index is a repeat index and three bits to identify the location of the repeated index relative to the current index. For example, the bits 540 include three bits that are set to a value of "000" to indicate that the current index is a repeat of the previous index so that the current index has a value of 10, which is the same as the value of the previous index.

Figure 6:
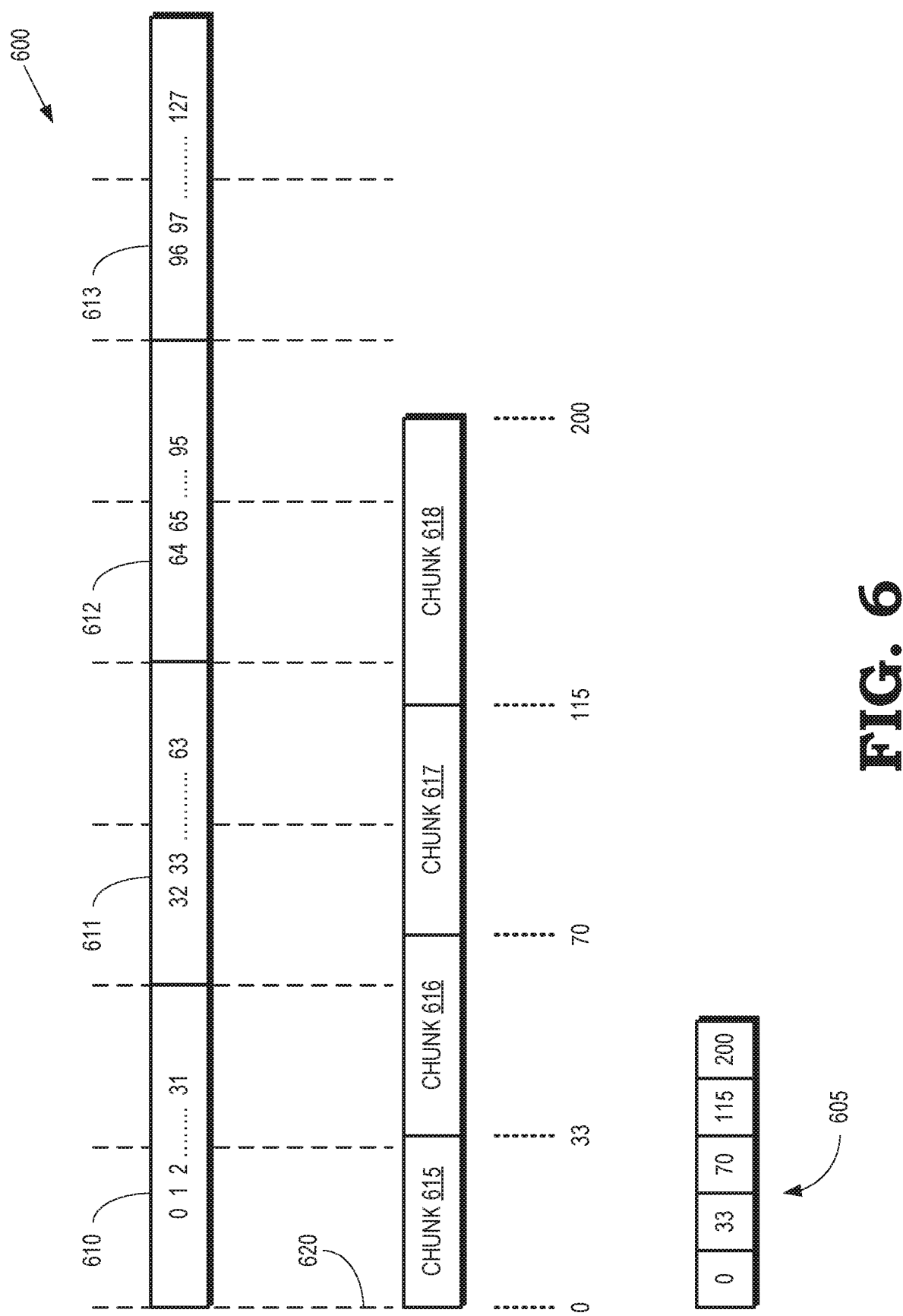
FIG. 6 is a diagram that illustrates a method of generating metadata for compressed chunks according to some embodiments.

FIG. 6 is a diagram that illustrates a method 600 of generating metadata 605 for compressed chunks according to some embodiments. The method 600 is implemented in some embodiments of the processing system 100 shown in FIG. 1, the graphics pipeline 200 shown in FIG. 2, and the portion 300 of the processing system shown in FIG. 3.

The metadata 605 is generated based on information in a series of uncompressed chunks 610, 611, 612, 613, which are collectively referred to herein as "the chunks 610-613." The chunk 610 includes the bits 0 . . . 31, the chunk 611 include the bits 32 . . . 63, the chunks 612 include the bits 64 . . . 95, and the chunk 612 include the bits 96 . . . 127. In the illustrated embodiment, the chunks 610-613 are compressed to form the compressed chunks 615, 616, 617, 618, which are collectively referred to herein as "the compressed chunks 615-618." The compressed chunks 615-618 are formed according to some embodiments of the method 400 illustrated in FIG. 4 for compressing monotonic chunks or the method 500 illustrated in FIG. 5 for compressing ordinary chunks. The number of bits in each of the compressed chunks 615-618 depends upon the compression method and the values of the indices within the chunks 610-613. The metadata 605 therefore includes values indicating the beginning addresses (0, 33, 70, 115) of the compressed chunks 615-618, as well as a value indicating the ending address (200) of the compressed chunks 618. The metadata 605 is therefore used to identify the bits in the compressed chunks 615-618, e.g., to support random access to the different compressed chunks 615-618.

In some embodiments, one or more of the compressed chunks 615-618 are fetched into or from a cache. Caches are typically organized in cache lines and data is fetched into or from the cache in blocks of bits that are equal to the size of a cache line. In the illustrated embodiment, cache lines have a length equal to 32 bytes. Uncompressed indices in the chunks 610-613 are represented by two bytes and each of the chunks 610-613 includes 32 indices. Thus, the chunks 610-613 are each stored in two cache lines, as indicated by the cache line boundaries 620 (only one indicated by a reference numeral in the interest of clarity). In contrast, the number of cache lines corresponding to each of the compressed chunks 615-618 depends on the compressed size of the compressed chunks 615-618, as well as the ordering of the compressed chunks 615-618.

The metadata 605 is used to determine the cache lines that are to be fetched for the compressed chunks 615-618. For example, the metadata 605 indicates that portions of the compressed chunk 615 are stored in the first and second cache lines. Two cache lines therefore are to be fetched in order to fetch the compressed chunk 615. For another example, the metadata 605 indicates that portions of the compressed chunk 618 are stored in three different cache lines and therefore three cache lines are to be fetched in order to fetch the compressed chunk 618. In some embodiments, the compressed chunks 615-618 are byte aligned to reduce the number of cache lines that are fetched in order to fetch the compressed chunks 615-618. Aligning the compressed chunks 615-618 with the cache line boundaries 620 has a small and perhaps negligible impact on performance of the compression algorithm disclosed herein.

Figure 7:
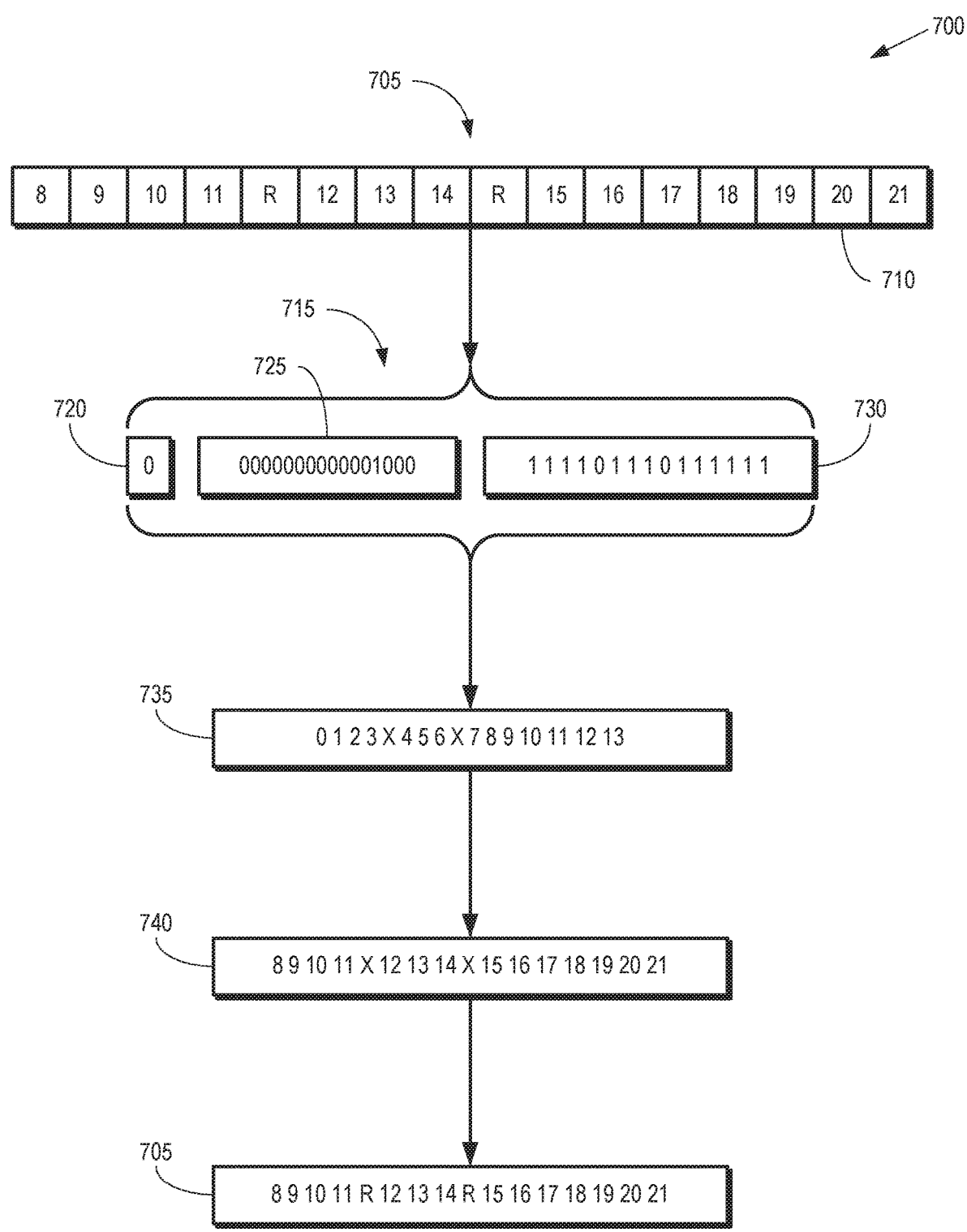
FIG. 7 is a diagram that illustrates a method of compressing indices in monotonic chunks to support concurrent decompression of the indices according to some embodiments.

FIG. 7 is a diagram that illustrates a method 700 of compressing indices in monotonic chunks to support concurrent decompression of the indices according to some embodiments. The method 700 is implemented in some embodiments of the processing system 100 shown in FIG. 1, the graphics pipeline 200 shown in FIG. 2, and the portion 300 of the processing system shown in FIG. 3. In the illustrated embodiment, the method 700 operates on a monotonic chunk 705 that includes indices 710 of triangle vertices and restart indices, as discussed herein.

Metadata 715 is generated based on the values of the indices 710. The metadata 715 includes a bit 720 that is set to a value that indicates that the monotonic chunk 705 is monotonic, e.g., a value of 0. Values of bits 725 are set to values that represent an offset that is equal to a value of the first index in the chunk 705. In the illustrated embodiment, the values of the bits 725 are set to " . . . 001000" to indicate an offset value of eight. The metadata 715 also includes a bit field 730 that indicates locations of the restart indices. In the illustrated embodiment, some entries in the bit field 730 have values of 1 to indicate the indices 710 that indicated vertices and some entries in the bit field 730 have values of 0 to indicate the indices 710 that are restart indices. The metadata 715 is stored in a memory such as the memory 115 shown in FIG. 1. The metadata 715 is then retrieved and used to reconstruct the uncompressed indices 710.

Decompression using the metadata 715 is performed by applying a bit count operation to the bit field 730 to generate a field 735 that represents prefix sums for the indices 710 that identify vertices and indications of inactive lanes that correspond to the locations of the restart indices. Each entry in the field 735 corresponds to a lane that is used to concurrently perform decompression of the corresponding index 710. For example, the first entry in the field 735 corresponds to a first lane of a graphics pipeline such as the graphics pipeline 200 shown in FIG. 2, the second entry in the field 735 corresponds to a second lane of the graphics pipeline, etc. In the illustrated embodiment, an "X" in an entry of the field 735 indicates the lanes that correspond to restart indices.

The value of the offset 725 is added to each of the prefix sums in entries of the field 735 to generate corresponding entries in a field 740. The addition operation is performed in the corresponding lane of the graphics pipeline which allows the lanes to perform decompression of the indices concurrently or in parallel. For example, a first lane generates a first entry in the field 740 that has a value of 8+0=8, a second lane generates a second entry in the field 740 that has a value of 8+1=9, etc. An "X" in an entry of the field 740 indicates the lanes that correspond to restart indices. In some embodiments, the lanes associated with the restart indices are disabled while the other lanes generated the uncompressed values of the indices 710. The lanes associated with the restart indices are then enabled and the previously enabled lanes are disabled. The lanes of the graphics pipeline associated with the restart indices output a value equal to the value that indicates the uncompressed restart index, thereby producing the uncompressed chunk 705.

Figure 8:
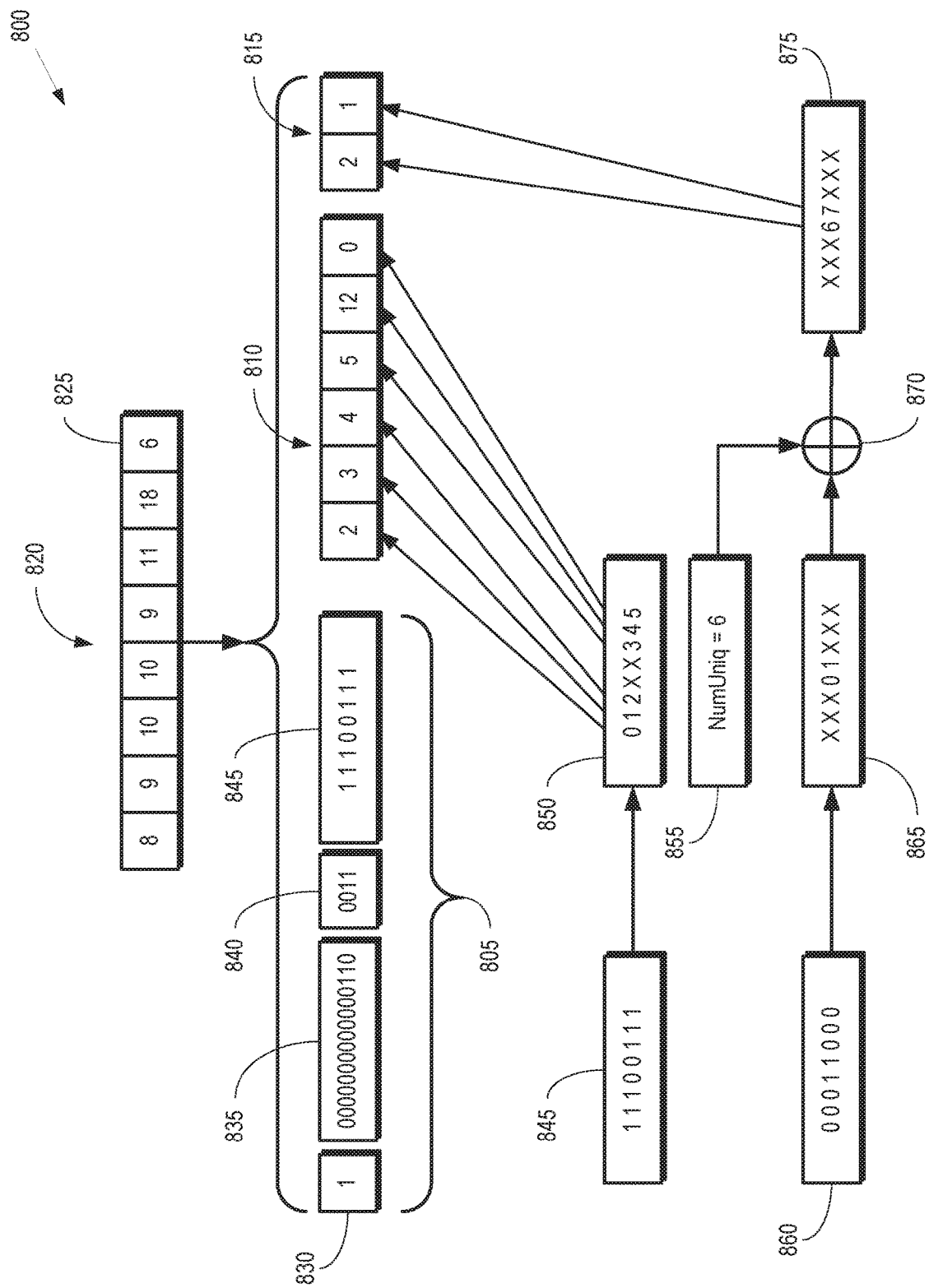
FIG. 8 is a diagram that illustrates a method of generating metadata and compressed indices for a compressed chunk according to some embodiments.

FIG. 8 is a diagram that illustrates a method 800 of generating metadata 805 and compressed indices 810, 815 for a compressed chunk according to some embodiments. The method 800 is implemented in some embodiments of the processing system 100 shown in FIG. 1, the graphics pipeline 200 shown in FIG. 2, and the portion 300 of the processing system shown in FIG. 3. The method 800 operates on an ordinary chunk 820 that includes bits representative of eight indices 825 (only one indicated by a reference numeral in the interest of clarity).

The metadata 805 includes a bit 830 that is set to a value that indicates that the compressed chunk represents a compressed ordinary chunk, e.g., by setting the value to 1. The metadata also includes bits 835 that are set to a value that represents an offset that is equal to a minimum value of the indices 825. In the illustrated embodiment, the minimum value of the indices 825 is equal to 6, and so the offset is represented by the bits 835 being set to " . . . 00110." The metadata 805 also includes bits 840 that are set to a value that indicates a number of bits that are needed to represent differences between values of the indices 825 and the offset value 835. The value represented by the bits 840 is therefore determined by a difference between the maximum value and the minimum value of the indices 825:

$$N_{bits}=\log_2(\max-\min)$$

In the illustrated embodiment, the maximum value is 18 and the minimum value is 6. The difference between these values is therefore represented with four bits. The value of the bits 840 is set to "0011" to indicate that the number of bits is 3+1=4.

The metadata 805 also includes a bit field 845 that includes values of bits that indicate locations of unique indices and repeat indices in the chunk 820. For example, values of 1 in entries of the bit field 805 indicate corresponding indices 825 that are unique and values of 0 in entries of the bit field 805 indicate corresponding indices 825 that are repeats of previous indices within the chunk 820.

Compressed indices 810, 815 are generated based on the metadata 805 and the values of the indices 825 in the chunk 820. The compressed indices 810 include values representing a difference between a compressed index 810 and a corresponding decompressed index 825. For example, the first compressed index 810 has a value of two, which is equal to a difference between the value (8) of the first decompressed index 825 and the value (6) of the offset 835. The compressed indices 810 include values of the unique indices in the chunk 820. The compressed indices 815 are associated with the repeat indices in the chunk 820. In the illustrated embodiment, the compressed indices 815 indicate locations of the unique index that is repeated in the corresponding repeat index 815. For example, the first compressed index 815 has a value of 2 to indicate the location of the corresponding unique index within the chunk 820. Locations of the indices 825 in the chunk 820 are numbered 0 . . . 7 in the illustrated embodiment.

A compressed chunk is therefore represented by the metadata 805 and the compressed indices 810, 815. In some embodiments, the compressed chunk is decompressed using multiple lanes of a graphics pipeline that decompress corresponding indices in parallel. In the illustrated embodiment, a bit count operation is performed on the bit field 845 to assign values to entries in a field 850. Each entry in the field 850 corresponds to a lane in a graphics processor. The entries corresponding to unique indices have values of (0, 1, 2, 3, 4, 5) and the entries corresponding to repeat indices are set to a value of "X." The values of the entries in the field 815 therefore map corresponding compressed indices 810. The corresponding lane of the graphics processor is therefore able to generate the decompressed value of the unique index by adding the offset 835 to the corresponding value of the compressed index 810. The lanes are able to perform these operations concurrently or in parallel. A number 855 of unique entries is also determined based on the bit field 845. In the illustrated embodiment, the number of unique entries is six.

In order to decompress the repeated indices, the bit field 845 is inverted to form an inverted bit field 860. In the illustrated embodiment, a bit count operation is performed on the inverted bit field 860 to assign values to entries in a field 865. The entries corresponding to repeat indices have values of (0, 1) and the entries corresponding to unique indices are set to a value of "X." Values of the entries corresponding to the repeat indices are provided to an adder 870 that adds the values to the number 855 to form entries in the field 875. For example, the value 0 in the field 865 is incremented by the value of six to form the value 6 in the corresponding entry of the field 875. The entries in the field 875 indicate corresponding compressed indices 815, which are used to generate the decompressed indices 825. The unique indices have already been decompressed and are therefore available to decompress the repeat indices. For example, the first compressed index includes a value of 2 that indicates the location of the corresponding unique index in the chunk 820. The unique index at the location indicated by the value of 2 has a value of 10, which is assigned to the decompressed repeat index.

In some embodiments, the apparatus and techniques described above are implemented in a system comprising one or more integrated circuit (IC) devices (also referred to as integrated circuit packages or microchips), such as the processing system described above with reference to FIGS. 1-8. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a compute unit configured to:
access a chunk of bits that represent indices of a plurality of vertices of a primitive that is to be processed by a graphics pipeline;
set a value of a first bit to indicate whether the chunk is monotonic or ordinary;
set values of second bits to define an offset that is determined based on values of indices in the chunk;
set values of sets of third bits that determine values of the indices in the chunk based on the offset defined by the second bits, wherein a first set of third bits indicates that at least one of the indices in the chunk is unique in having a value that is not equal to the value of any previous index within the chunk, and wherein the first set of third bits further indicates a difference between the unique index and the offset; and
write a compressed chunk represented by the first bit, the second bits, and the sets of third bits to a memory.

2. The apparatus of claim 1, wherein the compute unit is configured to:
generate metadata that represents a beginning address of the compressed chunk stored in an index buffer; and
write the metadata to the memory.

3. The apparatus of claim 2, wherein the chunk is a monotonic chunk that represents successive adjacent primitives by adding an index of a vertex that is not shared by the adjacent as triangles to the bits of the chunk, and wherein the compute unit is configured to set the value of the first bit to a first value to indicate that the chunk is monotonic.

4. The apparatus of claim 3, wherein the compute unit is configured to set the values of the second bits to an offset value that is equal to a value of a first index in the chunk that is not a restart index that indicates that a subsequent primitive is not adjacent to a previous primitive represented an index previous to the restart index.

5. The apparatus of claim 4, wherein the compute unit is configured to set values of a first set of the third bits to indicate a number of restart indices in the chunk and setting at least one additional set of third bits to indicate at least one location of at least one restart index within the chunk.

6. The apparatus of claim 4, wherein the compute unit is configured to generate metadata comprising a bit field indicating locations of restart indices in the chunk, and wherein the compute unit is configured to write the metadata comprising the first bit, the second bits, and the bit field to the memory.

7. The apparatus of claim 2, wherein the chunk is an ordinary chunk that represents primitives using indices of all the vertices of the primitive, and wherein the compute unit is configured to set the value of the first bit to a second value to indicate that the chunk is ordinary.

8. The apparatus of claim 7, wherein the compute unit is configured to set the values of the second bits to an offset value that is equal to a minimum value of the indices in the chunk.

9. The apparatus of claim 8, wherein the compute unit is configured to:
set values of a second set of third bits to indicate a number of bits that are used to represent differences between the values of the indices and the offset value; and
set values of at least one third set of third bits to indicate that at least one of the indices is a repeated value of a unique index and to indicate a relative location of the unique index in the chunk.

10. The apparatus of claim 8, wherein the compute unit is configured to generate metadata comprising a bit field indicating lanes that are used to decompress indices in the compressed chunk, and wherein the compute unit is configured to write the metadata comprising the first bit, the second bits, a second set of third bits to indicate a number of bits that are used to represent differences between the values of the indices and the offset value, and the bit field to the memory.

11. An apparatus comprising:
an index buffer configured to store indices of vertices of primitives that are processed by a graphics pipeline; and
a compute unit configured to:
decompress indices in a first compressed chunk of bits representing the indices based on a first bit in the first compressed chunk that indicates whether the first compressed chunk is monotonic or ordinary, second bits in the first compressed chunk that define an offset that is determined based on values of the indices in the first compressed chunk, and sets of third bits in the first compressed chunk that determine values of the indices in the first compressed chunk based on the offset defined by the second bits, wherein a first set of third bits indicates that at least one of the indices in the chunk is unique in having a value that is not equal to the value of any previous index within the chunk, and wherein the first set of third bits further indicates a difference between the unique index and the offset; and write the decompressed indices in the first compressed chunk to the index buffer.

12. The apparatus of claim 11, wherein the compute unit is configured to identify the first bit, the second bits, and the sets of third bits for the first compressed chunk based on metadata including a first beginning address of the first compressed chunk and a second beginning address of a second compressed chunk from metadata.

13. The apparatus of claim 11, wherein the compute unit determines, based on the first bit, that the first compressed chunk is a monotonic chunk that represents successive adjacent primitives by adding an index of a vertex that is not shared by the adjacent as triangles to the bits of the first compressed chunk, and wherein the values of the second bits are set to an offset value that is equal to a value of a first index in the first compressed chunk that is not a restart index that indicates that a subsequent primitive is not adjacent to a previous primitive represented an index previous to the restart index.

14. The apparatus of claim 13, wherein values of a second set of the third bits indicate a number of restart indices in the first compressed chunk and at least one additional set of third bits indicates at least one location of at least one restart index within the first compressed chunk.

15. The apparatus of claim 11, wherein the compute unit determines, based on the first bit, that the first compressed chunk is an ordinary chunk that represents primitives using indices of all the vertices of the primitive, wherein the second bits indicate an offset value that is equal to a minimum value of the indices in the first compressed chunk, wherein a second set of third bits indicates a number of bits that are used to represent differences between the values of the indices and the offset value, and at least one third set of third bits indicates that at least one of the indices is a repeated value of a unique index and indicates a relative location of the unique index in the chunk.

16. An apparatus comprising:
an index buffer configured to store indices of vertices of primitives that are processed by a graphics pipeline; and
a plurality of compute units configured to concurrently:
access metadata for compressed chunks, wherein the metadata comprises first bits to indicate whether the compressed chunks are monotonic or ordinary, second bits to define offsets that are determined based on values of the indices, and a first set of third bits to indicate that at least one of the indices in the compressed chunks is unique in having a value that is not equal to the value of any previous index within the chunk, wherein the first set of third bits further indicates a difference between the unique index and the offsets;
decompress the compressed chunks based on the metadata; and
write the decompressed indices to the index buffer.

17. The apparatus of claim 16, wherein the first bits indicate that the compressed chunks are monotonic compressed chunks, and wherein a second set of third bits indicate locations of restart indices in the compressed chunks.

18. The apparatus of claim 16, wherein the first bits indicate that the compressed chunks are ordinary compressed chunks and wherein a second set of third bits indicates which of the plurality of compute units are used to decompress indices in the compressed chunks.

19. The apparatus of claim 18, wherein the metadata comprises fields indicating numbers of bits that are used to represent differences between the values of the indices and the offsets for the compressed chunks.

20. The apparatus of claim 19, wherein the compute unit is configured to access compressed indices in the compressed chunks based on beginning addresses of the compressed chunks stored in the metadata, and wherein the compute unit is configured to decompress the compressed chunks based on the compressed indices, the offsets, and the first set of third bits.

* * * * *